United States Patent [19]

Bartholomew

[11] Patent Number: 4,919,403
[45] Date of Patent: Apr. 24, 1990

[54] SERPENTINE STRIP SPRING

[75] Inventor: Donald D. Bartholomew, Marine City, Mich.

[73] Assignee: Proprietary Technology, Inc., Southfield, Mich.

[21] Appl. No.: 218,102

[22] Filed: Jul. 12, 1988

Related U.S. Application Data

[63] Continuation-in-part of Ser. No. 916,155, Oct. 7, 1986, abandoned.

[51] Int. Cl.⁵ .............................. F16F 1/02
[52] U.S. Cl. ...................... 267/165; 188/371; 267/181
[58] Field of Search .............. 267/47, 74, 85, 87, 267/107, 108, 109, 163, 164, 165, 181, 182; 188/371, 372, 373

[56] References Cited

U.S. PATENT DOCUMENTS

| 758,820 | 5/1904 | Chaplin . | |
|---|---|---|---|
| 1,472,966 | 11/1923 | Englund . | |
| 2,063,216 | 12/1936 | Zaparka | 267/165 X |
| 2,145,166 | 1/1939 | Douglas | 262/165 X |
| 2,276,988 | 3/1942 | Leslie . | |
| 2,517,269 | 8/1950 | Wolfe | 262/182 |
| 2,751,651 | 6/1956 | Cooper . | |
| 3,251,590 | 5/1966 | Kraeling . | |
| 3,303,541 | 2/1967 | Beach . | |
| 3,482,872 | 12/1969 | Chamberlain | 188/371 X |
| 3,765,066 | 10/1973 | Nitz . | |
| 4,325,268 | 4/1982 | Benteler et al. . | |
| 4,402,113 | 9/1983 | Smith . | |
| 4,588,093 | 5/1986 | Field | 267/165 X |
| 4,703,669 | 11/1987 | Hyodo | 188/371 X |

FOREIGN PATENT DOCUMENTS

| 677241 | 12/1963 | Canada . | |
|---|---|---|---|
| 2501397 | 11/1975 | Fed. Rep. of Germany . | |
| 1293445 | 4/1962 | France | 267/163 |
| 1291263 | 10/1972 | United Kingdom . | |

Primary Examiner—George E. A. Halvosa
Attorney, Agent, or Firm—Harness, Dickey & Pierce

[57] ABSTRACT

Disclosed is a new basic type of extension or compression spring that can be made from thin or heavy strip stock, but yields spring strengths associated with much heavier and larger springs of currently used coil, leaf and other types. Additionally, the new spring provides a two or three spring constant response consisting of a first strong spring response, then a weaker spring response, then (if desired) a strong spring response. The variable rate is controllable by design, and no new technology is required to make springs with a very wide spectrum of strength and non-linear response. Anticipated applications range from a new type of hose clamp to direct reading torque indicators or automotive suspension springs.

18 Claims, 4 Drawing Sheets

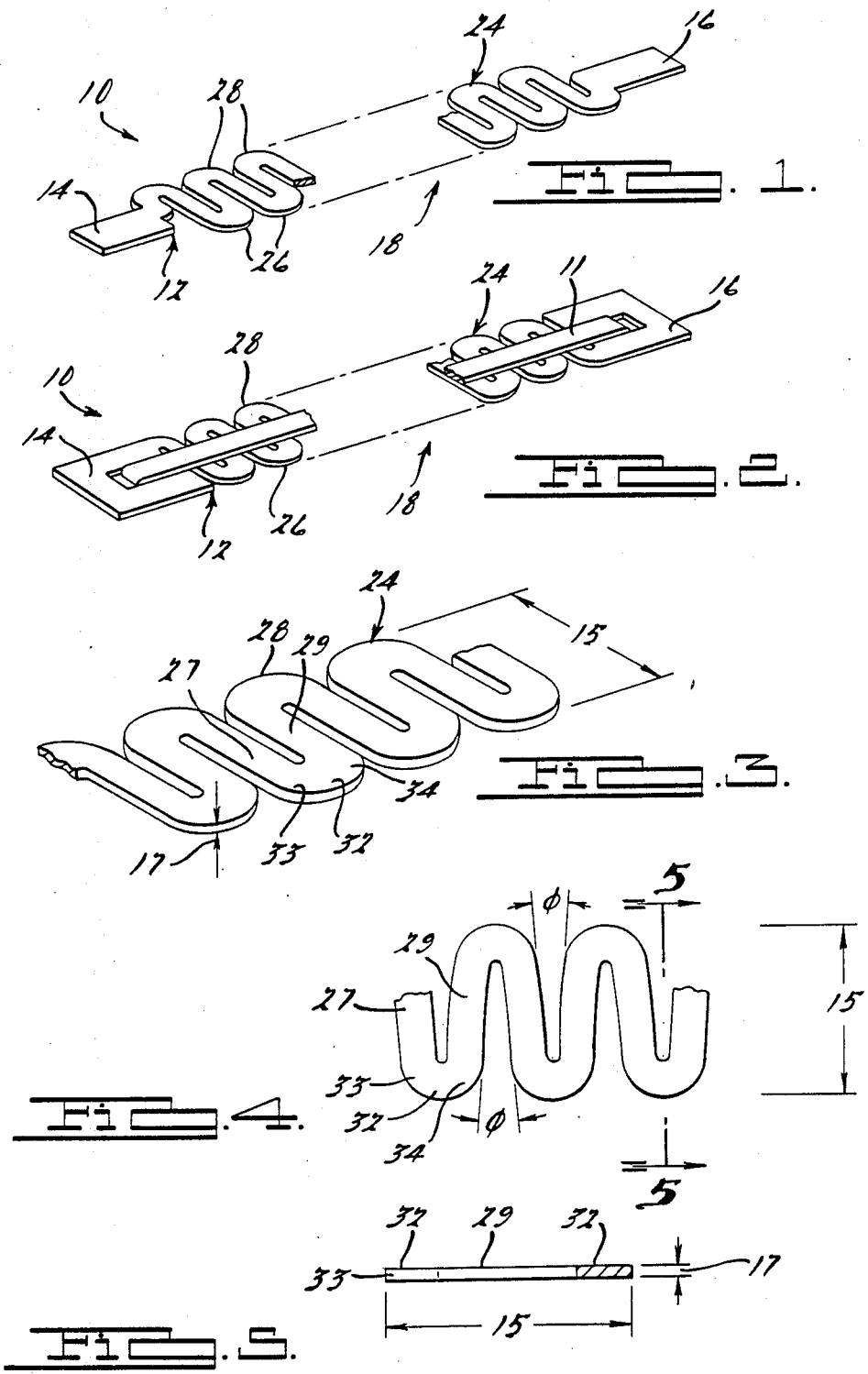

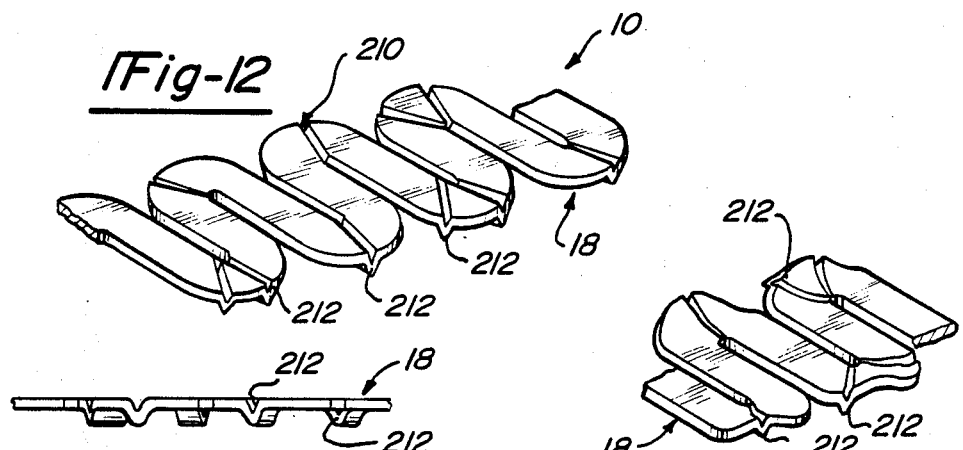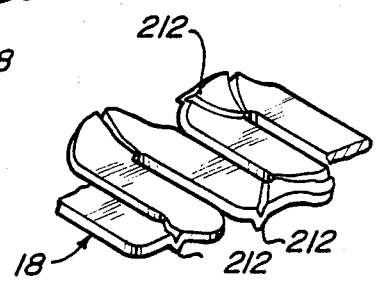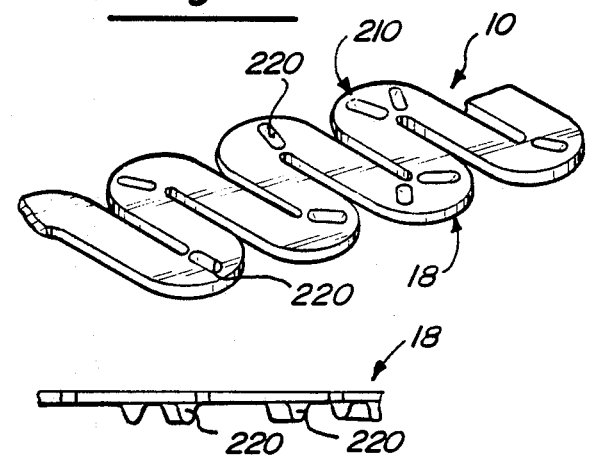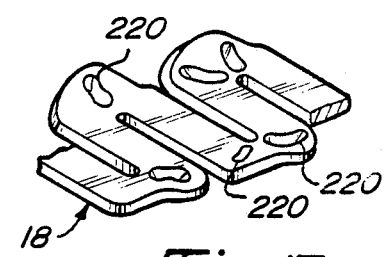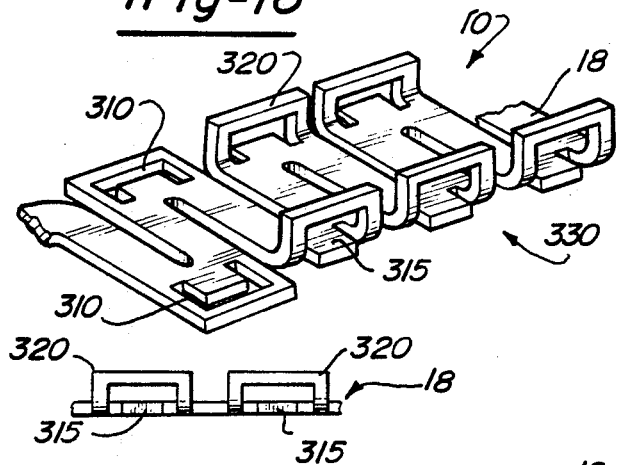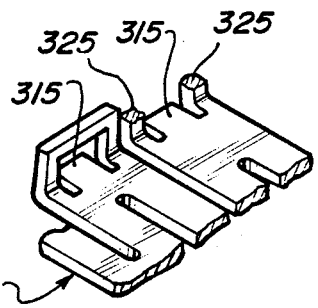

SERPENTINE STRIP SPRING

RELATED APPLICATIONS

This is a continuation-in-part of U.S. Pat. application Ser. No. 916,155, field Oct. 7, 1986, entitled "Serpentine Strip Spring", now abandoned.

BACKGROUND AND SUMMARY OF THE INVENTION

The present invention relates to springs and more particularly, to springs formed from elongated strip materials without bending and having a biasing portion with undulations, indentations or the like, to enable deflections in a longitudinal axial direction and along the thickness of the spring.

Springs are used in numerous applications for storing and displacing energy. Several types of springs exist; those most commonly known are coil, leaf, disc, spiral springs, and the like, which are used in numerous tensioning and compression applications. Generally, these type of springs work very well for their intended purpose.

When an application is best served by a spring, having flat planar characteristics, which is able to deflect in a longitudinal axial direction, the above disclosed springs will not qualify for this type of application unless additional money is expended to adapt them to the application. Generally, when elongated, flat, planar springs are used, the applications are like those where leaf springs are commonly used. Leaf springs deflect transverse to the longitudinal axis of the elongated strip member, and thus, are unable to perform deflection in a longitudinal axial direction. While coil and spiral springs are capable of deflecting along their longitudinal axes, these springs require additional space and are incapable of being positioned in a narrow, flat, planar opening. Thus, there exists a need in the field for a spring exhibiting flat planar characteristics, while having good resilient and strength properties, and is able to deflect in a longitudinal axial direction. Serpentine shaped springs exist which would operate within these space limitations, but these springs are formed by bending round or square wire into the serpentine shape. The spring disclosed herein is manufactured from a wide strip, by removing materials to achieve the serpentine shape.

Accordingly, it is an object of the present invention to overcome the disadvantages of the above art. The present invention provides the art with a flat, planar, elongated strip spring which enables deflection i a longitudinal axial direction. The present invention enables relatively strong springs to be formed from thin, metallic strip material. The present invention enables deformation of the spring to occur along its width dimension, as well as its cross-section dimension, which, in turn, enables the spring constant of the spring to be easily chosen for a desired application. The present invention provides the art with a relatively strong spring which utilizes a relatively small amount of material with respect to the strength of the spring. Also, the spring exhibits a non-constant or variable force constant which is useful in many tension and compression applications.

The new and improved spring of the present invention is generally formed from a metallic strip material. The spring includes an elongated, flat, metallic strip having a primary biasing portion formed by removal of material, or other means, with undulations, indentations or the like integrally formed from the strip to additionally gain or enhance the primary and/or secondary biasing response. The primary biasing portion enables axial deflection of the spring along the longitudinal axis and along the cross-section direction of the elongated strip. The spring may also include a pair of end members for enabling securement of the spring. The secondary biasing portion is derived from deflection of the strip material by bending across the thickness direction in the manner of a leaf type spring.

Generally, the primary biasing portion of the spring is formed in a serpentine configuration. The serpentine configuration is an integral part of the elongated strip member and may extend the entire length of the strip or only a portion of the strip. The serpentine configuration is formed in the strip by removing the outer portions of the elongated strip between the curved and leg portions of the serpentine configuration or the spring is molded or cast in the shape, so that each element of the serpentine has an "U" shape configuration.

Also disclosed is a method of manufacturing the spring of the present invention. The method includes providing an elongated, metallic strip material and forming an integral biasing portion with undulations, indentations or the like in the strip for enabling axial longitudinal primary deflection and cross-sectional secondary deflection of the spring. The method also includes forming end members on the elongated strip by bending, stretching, as well as punching, etc., and when desired to produce special force constant results, by similar treatment to the "U" sections. The forming of the biasing portion further includes stamping an integral serpentine configuration section into the elongated strip in the embodiments that are shown.

Also disclosed are design and performance parameters of a serpentine strip spring which are somewhat different in tension and compression than springs heretofore used.

Serpentine strip springs are unique in that they may exhibit two or even three spring constants (nominally force/extension), instead of the single spring constant exhibited by springs which have been manufactured by bending the material from which the spring is formed. To exhibit multiple force constant, two modes of flexure are encouraged by the shape of the serpentine strip spring. One flexure is the primary across the broad dimension of the shape, and the other is the secondary across the metal thickness. The serpentine spring, by definition, has a width which is much greater than its thickness (by a factor of 3 or more of the "U" elements) to form the tight "S" shape of the "U" elements of the serpentine strip spring.

The stretching of a serpentine strip spring takes place as follows: First, there is bending or flexing across the primary broad width dimension. Since the material being bent is quite wide, relative to the physical size of the spring, a high force constant is generated. The secondary surfaces of the spring are essentially planar at the time of the initial deformation, other secondary deformations then occur as bending in the thickness direction which alter the original force constant. For explanation purposes, the spring is comprised of reversing "U" elements. As the legs of the "U" are pulled apart, the legs and base of the "U" flex and the angle between the legs increases from a reference zero degree unstretched position. It should be noted that the original width of the strip controls the overall length of the legs of successive "U" elements, and thus, controls the extension of the spring for any given angle between the legs of the "U" elements greater than the unstretched zero degree position.

Second, as stretching continues, the stiffness contribution of the metal thickness begins to be overcome by the compressive resistance of the outside periphery of the base of the "U" elements. At this point, "puckering" or a departure from a planar surface begins to occur at the outside of the "U" elements and twisting begins to occur in the legs of the "U" elements; this is the secondary response. The interior radius of the "U" base is under considerable tension. This is a result of the "lever" forces exerted by the legs which, in turn, form considerable compression in the exterior radius of the "U" base. It is important to note that at this time, no part of the serpentine strip spring is deformed beyond the "Hookes law" region. Also at this time, the spring has a spring constant which is a combination of the original primary mode, planar width deformation, and a secondary mode, bending and twisting of the "U" elements.

The point at which the outer radius of the "U" base begins to depart from the planar surface and starts to "pucker" is strongly influenced by the ratio of width of the strip to thickness of the strip. Altering this ratio and also including certain formed portions to control the stiffness across the material width or apparent thickness direction controls the onset and character of the "pucker" and twisting of the "U" elements. Thus, a spring can easily be designed with a quickly rising resistance to initial extension, having a large force constant in the first mode, giving way to a much more compliant lower force constant in the second mode. The design is executed in a manner wherein extension is halted prior to failure, as is the case with any spring.

Failure of the serpentine strip spring takes place in two stages. First, bending failure occurs in the base of the "U"'s; where folding ("puckering" and twisting under the forces imposed by the legs) occurs causing the strip to be pulled straight. This failure continues until the base of the "U"'s become folded. Folding continues until the strip has been pulled out straight. At this point, the tensile force on the inside radius of the "U" base begins to be the final limiting factor. Final failure occurs when the interior radius of the "U" base finally tears.

To develop design characteristics of serpentine strip springs, a finite element analysis should be done on the force, and resistance to the force, that is occurring during the transition from mode one bending primary, to mode one bending plus mode two secondary puckering and twisting. For given metal properties, to determine a desired mode one spring constant and a desired mode one "pre-load", which is before the onset of mode one plus mode two spring constant, a choice of the width to thickness ratio and the width of the serpentine strip spring elements must be determined. Also, the shape of the "U" legs and base will influence the onset of mode one plus mode two bending since the legs and base resistance to twist also impacts on the onset of "puckering" as well as the extension of the spring do to a given force. It must be appreciated that when the "U" legs and base are deformed but still planar, that the angle between the legs is greater than the unstressed angle. This stressed angle is only a few degrees. The length of the legs (dictated by the width of the original strip) is thus very important to the amount of extension for a given angle. When the "puckering" of the "U" base occurs, there is suddenly a larger increase in this angle per unit of added force, and the spring now extends (or compresses) much more. This is, of course, the onset of a new lower force constant.

Deriving samples to confirm the theory and findings is fortunately fairly straight forward. It is not necessary to make a stamping die for each spring configuration. Instead, the strip thickness and width are chosen, and manufactured by utilizing "chemical milling" or laser cutting processes. The spring may be quickly and inexpensively produced in the desired flat shapes compared to stamping die costs for small quantities.

Serpentine strip springs are very simple in concept, but are relatively complicated in practice because of the interrelationships of all the factors which influence the final result. Failure to fully understand these relationships most likely explains serpentine strip spring's historical non-use. Until one recognizes what can be done with these types of springs, the tendency is to declare the spring a waste of time.

The use of a spring with more than one spring constant, that is essentially a flat strip of material, which stretches like any heavy spring at first, and then while continuing to apply the initial force, stretches further with a much less increase in load, evokes thoughts of where can a device be used. Some immediate possibilities are metal "bungee" straps; special clamps; preloading devices for applications having movement beyond the capabilities of single constant springs within the space available; shock absorbing drive "chains" that are not chains at all but a strip of metal, using a universal joint type drive strip with encoders for angular position to obtain a dynamic torque measurement and a whole family of unique compression springs, which are made by rolling the strip along its long axis into a tubular shape.

Consideration of application areas leads one to the conclusion that in all sorts of products there are mechanical, hydraulic, and pneumatic assemblies that may be replaced by the new spring at a considerable savings of space and cost.

From the following description and claims taken in conjunction with the accompanying drawings, other objects and advantages of the present invention will become apparent to one skilled in the art.

BRIEF DESCRIPTION OF THE DRAWINGS

In the accompanying drawings:

FIG. 1 is a perspective view of a spring in accordance with the present invention.

FIG. 2 is a perspective view of a spring in accordance with the present invention.

FIG. 3 is an enlarged partial perspective view of the serpentine portions of FIG. 1 and 2.

FIG. 4 is a top plan view of the serpentine portion of FIGS. 1 and 2.

FIG. 5 is a cross-sectional view through line 5—5 of FIG. 1.

FIG. 12 is a perspective view of a spring in accordance with the present invention.

FIG. 13 is a side elevation view of FIG. 12.

FIG. 14 is a view of the spring of FIG. 12 illustrating a tensional force producing puckering.

FIG. 15 is a perspective view of a spring in accordance with the present invention.

FIG. 16 is a side elevation view of the spring of FIG. 15.

FIG. 17 is a view of the spring of FIG. 15 illustrating a tensional force producing puckering.

FIG. 18 is a perspective view of a spring in accordance with the present invention.

FIG. 19 is a side elevation view of the spring of FIG. 18.

FIG. 20 is a view of the spring of FIG. 18 illustrating a tensional force producing puckering, with the "pucker" limiter.

DETAILED DESCRIPTION OF THE PREFERRED EMBODIMENT

Figures 6, 7:
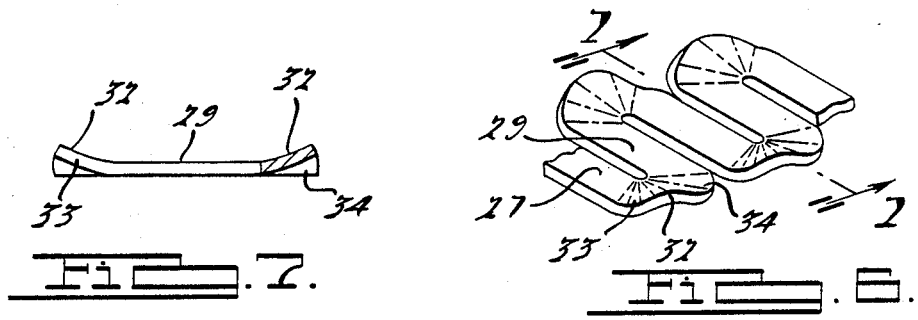
FIG. 6 is a view of FIG. 5 illustrating a tensional force producing "puckering".
FIG. 7 is a cross-section view of FIG. 6 through line 7—7 thereof.

Turning to the figures, a spring is shown and designated with reference numeral (10). The spring (10) includes a flat, elongated, metallic strip (12) having end portions (14) and (16) and a biasing portion (18). The spring (10) may also include a biasing portion (16) extension limiting member (11), and end members (14) and (16) as shown in FIG. 2. Also, the spring may include a securement mechanism like those disclosed in U.S. Patent Application Ser. No. 916,115, now abandoned, entitled "Serpentine Strip Spring Hose Clamp" filed Oct. 7, 1986, the specification of which is herein incorporated by reference.

The elongated metal strip (12) may be formed from any suitable metallic or non-metallic sheet material having requisite strength and resilient characteristics. The strip (12) has a desired width and thickness such that a desired spring constant may be obtained from the material. Generally, the width (16) of the spring (10) controls the stiffness of the spring (10) for a given material thickness (17), and the original strip width (15) affects the length of legs (27) and (29), which strongly affect the extension for a given load. The length of the spring (10) also controls the number of "U" elements and also controls the longitudinal deflection of the spring (10), which occurs in two or three modes prior to failure. To increase longitudinal deflection to the spring (10) without increasing the overall non-deflected length of the spring (10), the width (15) of the spring (10) may be increased, which, in turn, enables an increase in longitudinal deflection while maintaining a constant spring length during non-deflection. Springs formed by bending are unable to achieve this strength and elongation while maintaining the small physical size that is provided by the present invention, because any attempt to bend a strip of width (16) would result in breakage. The spring (10) generally employs a width (16) to thickness (17) cross-section ratio of three or more. The deflection of the spring (10) in mode one response causes deformation in the width portion (16) and in "U" shaped portions (26) and (28) as shown in FIG. 4, whereas in coil, leaf, disc, and spiral springs, the deformation is in the thickness portion of the spring. Mode two response is the flexing across the thickness portion as is shown in FIGS. 6 and 7.

Generally, the strip (12) has an overall flat, elongated, rectangular shape. The end portions (14) and (16) are integrally formed onto the ends of the spring (10) and may have a width somewhat less than the strip (12). The end portions (14) and (16) may be rectangular shaped and are formed from the same material as the strip (12). The biasing portion (18) may be formed in the strip (12) by stamping, or other means, the serpentine configuration (24) from the strip (12). The forming by stamping, etc., of the serpentine configuration (24) removes portions of the strip from in between the curved "U" shaped members of the serpentine configuration (24). The serpentine configuration (24) is formed from reversing "U" shaped members (26) and (28) sharing a common leg with the next reversing "U" shaped member (26). The serpentine configuration (24) enables the spring (10) to deflect in a longitudinal axial direction. The reversing "U" shaped members (26) and (28) include legs (27) and (29), base (32), and curvatures (33) and (34) connecting the legs (27) and (29) to the base (32). The width of the legs (27) and (29), base (32) and curvature (33) and (34), along with the thickness (17) of the strip, control the spring constants of the biasing portion (18). Choosing these parameters and other factors shown in other figures, material, and thickness provides the spring with a desired spring constant pattern. This spring constant pattern may also be affected by forming certain shapes in the "U" base and legs that control the bending across the thickness (17).

The spring (10), in the embodiments shown, is generally manufactured from a desired metallic sheet material having desired characteristics. The strip (12) is cut from the desired sheet material having a desired thickness and the proper width and length dimensions. Thickness also controls the pucker function which contributes to the spring constant. The biasing portion (18) is formed into the strip by removing material from the strip (12) by stamping, cutting, or the like, to form the serpentine configuration (24). The end members (14) and (16) are also formed on the ends of the strip (12). The formed spring exhibits axial deflection characteristics as described herein.

FIG. 2 illustrates the spring (10) with an element (11) disposed within slots in ends (14) and (16) to limit the stretch of the spring (10).

FIG. 3 is a partial view of spring (10) illustrating detail of the various portions of the biasing portion (18). In the normal spring mode of extension, a "U" shaped member (26) would have forces applied that tend to pull legs (27) and (29) apart. The leg sections (27) and (29) apply force to the curved sections (33) and (34) and base section (32). Flexure of all of these sections results in increasing the zero reference angle ($\phi$), which is present in a non-stretched position, to a stretched condition shown in FIG. 4. The condition shown in FIG. 4 relates to normal flecture of the spring and such a configuration is designated as mode one deformation. FIG. 5 illustrates a cross section of the biasing portion (18) for mode one deformation.

When further stretching force is applied, mode two deformation begins, as shown in FIGS. 6 and 7. Mode two deformation occurs as the compressive strength of outer areas of segments (32), (33), and (34) begin to take precedence over the tensile and flexural forces. The result is the "puckering" of the base (32) and twisting of the legs (27) and (29), as seen in FIG. 6. An important feature of the serpentine strip spring now begins to occur. Note that as "puckering" occurs, the FIG. 4 angle (φ) becomes much larger and the spring enters into a mode where more extension occurs with each unit force of added pull. The onset of "puckering" is closely related to the width (15) and (16) and the effective thickness (17) of the individual components of the "U" sections (27), (29), (32), (33), and (34), and in this mode the thickness (17) and apparent width modifying treatments shown in FIGS. 12-20 most strongly control the results since the phenomena is closely related to flexing the cross section (17) thickness, or effective thickness if forming has stiffened these elements in the thickness (17) direction. Failure of the spring (10) takes place after the full accommodation of the "puckering", mode two deformation, and the puckering becomes uncontrolled until a tear develops in the small radius of the base section (32).

Figure 8:
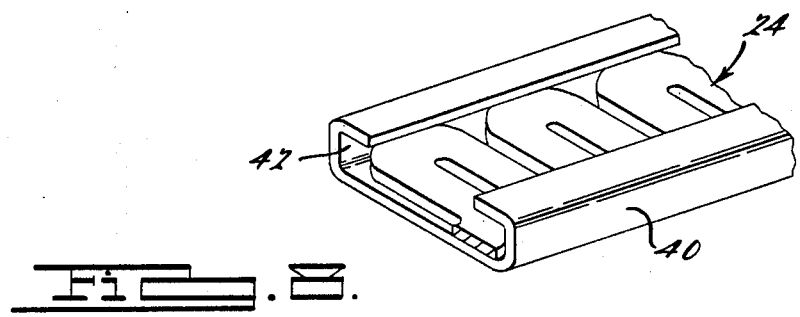
FIG. 8 is a perspective view of a pucker limiting carrier.

It is possible to delay the failure of the spring by placing the spring biasing portion (18) in a "pucker" limiting carrier (40) as shown in FIG. 8. The carrier (40) limits the "puckering" or mode two deformations so that the spring remains within Hookes law and the spring is reciprocal. This is done when one wishes a high force constant, then a lower force constant, then a return to a high force constant, or one does not use member (11) of FIG. 2 as an extension limitation. In FIG. 8, the gap (42) is dimensioned to preclude permanent deformation from "puckering" until much higher extension forces are encountered. With the carrier (40) being used, the application of further stretching produces results in mode three stretching response. Mode three stretching response is similar to mode one stretching response, but slightly different in spring constant because of the "puckered" configuration in effect during mode three stretching. FIGS. 18, 19, and 20 also show a method for achieving this benefit.

Figure 9:
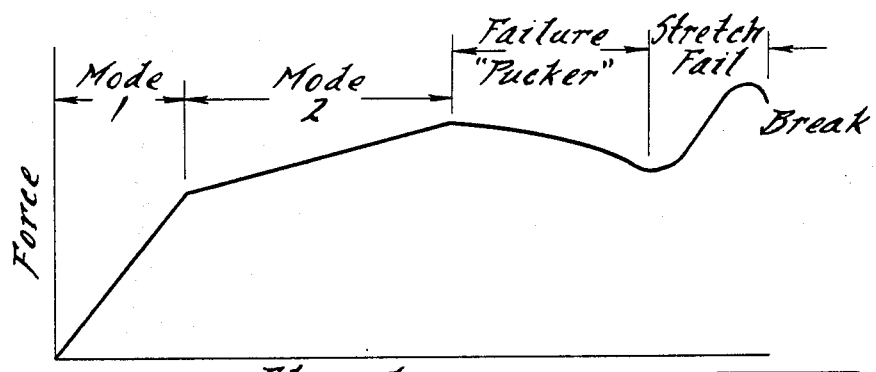
FIG. 9 is a graph illustrating loading of a spring of the present invention.
Figure 10:
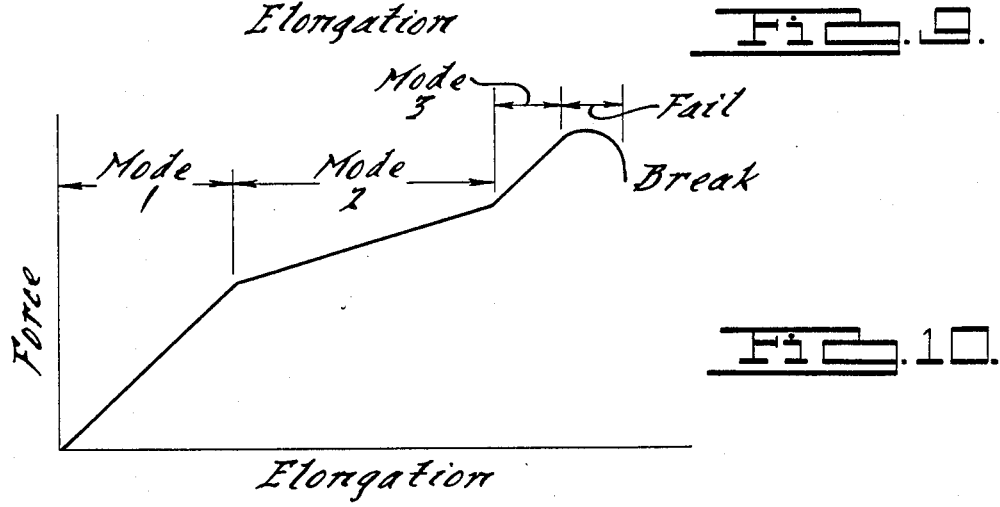
FIG. 10 is a graph illustrating loading of a spring in the pucker limiting carrier of the present invention.

FIGS. 9 and 10 are graphs which more clearly illustrate the effect on the stretching force—elongation curves of serpentine strip springs.

FIG. 9 illustrates an unlimited spring response wherein failure starts to occur after mode two. This failure is essentially a flexural failure across the thickness (17) of the spring causing the spring to begin to stretch rapidly. After all of the accommodation that can be made by flexural "pucker" type bending across thickness (17) has been made, failure by stretching takes over and the material eventually tears near segment (32).

FIG. 10 shows the effect of using the "pucker limiting" carrier (40). The carrier (40) and gap (42) prevent the deformation required to enter "pucker failure" of mode two. This causes a resumption of the mode one type stretching, but at a different force-vs-deflection rate. Failure occurs as tearing near a segment (32).

A study of FIGS. 9 and 10 reveal a useful aspect of serpentine strip springs. During mode one deformation, restoring force is rapidly developed as the spring is stretched. When mode two response takes over, a considerable amount of further stretching takes place with less force increase per unit elongation. This mode two response is useful where a minimum level force needs to be present, but where it is desirable to apply as little force in excess of a minimum level as is practical, yet accommodate the tolerances or necessary movement of a device. Serpentine strip springs have the unique ability to accommodate this very frequently needed characteristic with very small size and weight. Also, the modes enable the spring to exhibit multiple constants.

Serpentine strip springs that are stabilized by a carrier as shown in FIG. 8 may also be used as compression springs. The "pucker" tendency in compression is not as strong since the portions that were in tension, in the tension applications, are now in compression and vice versa. The compressed areas are now the inside of the curved sections (32), (33), and (34). When the leg segments (27) and (29) are long enough, compared to their width (15) and thickness (17), to easily "pucker" in the legs (27) and (29), then a mode two response may be attained as well.

Figure 11:
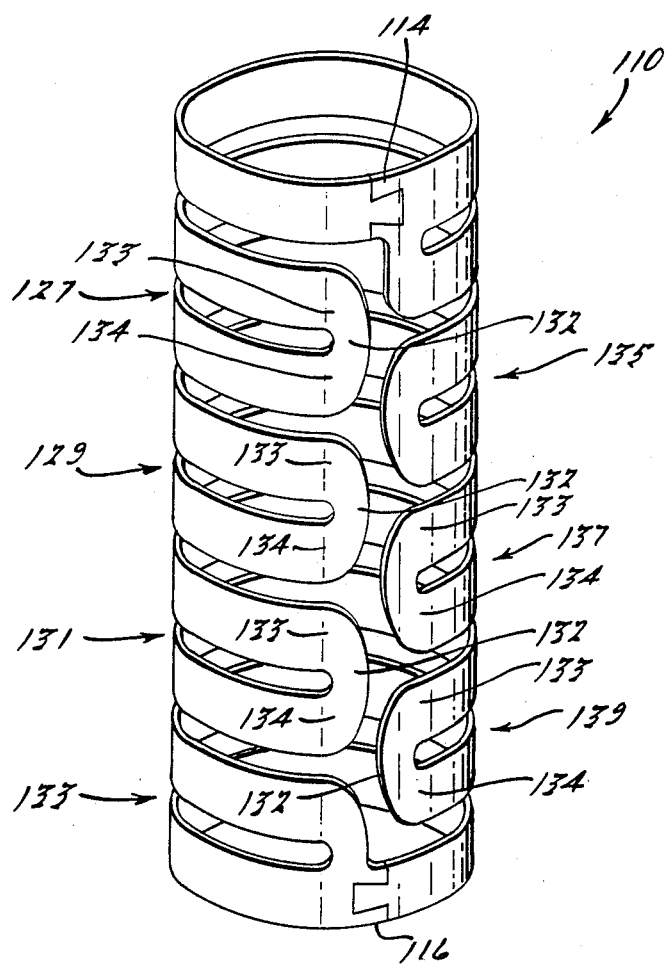
FIG. 11 is a perspective view of a spring in accordance with the present invention.

In compression applications, other methods of overcoming the lack of columnar strength (thin strip) so that the mode one force constant will come into effect may be employed. One embodiment of a compression serpentine strip spring is shown in FIG. 11 The spring (110) with the serpentine "U" elements (127, 129, 131, 133, 135, 137, etc.) and ends 114) and (116), has first been made as a wide flat strip spring then rolled to form a tubular shape. The mode two characteristic in FIG. 11 has been affected by bending the curved and base portions (132), (133), and (134) of the "U" away from the planar form, but mode two characteristics are still controllable by merely taking into account the effect during spring design.

FIGS. 12-20 illustrate other embodiments of the present invention. The reference numerals which relate to the same elements as previously described, will be indicated as such.

FIG. 12 illustrates a spring (10) formed from a flat metallic sheet material. The spring (10) includes biasing portion (18). The biasing portion (18) includes one or more discontinuities (210) at different positions along the biasing portion (18). The discontinuities (210) are undulations (212) altering the shape of the substantially flat planar spring. A number of undulations as seen in FIGS. 12-14 may be positioned on the base and curved portion of the spring (10). The undulations (212) help to modify the bending propensities of the strip material, to control the puckering of the curved "U"s. The undulations (212) help to control the onset of the cross-section portion bending relative to the width bending. Thus, the spring constant may be controlled during the elongation of the spring.

As can be seen in FIG. 14, the spring pucker still occurs, but is affected by the undulation to control the puckering which in turn controls the deflection along the cross-section of the spring.

Moving to FIGS. 15-17, another embodiment of the discontinuities (210) is shown. The spring 10 includes one or more dimples or indentations (220) in the biasing portion (18). The dimples or indentations (220) provide the biasing portion (18) with the deflection control characteristics as explained above. FIG. 17 illustrates the puckering of the base and curve portions to control the deflection of the spring.

FIGS. 18-20 illustrate yet another embodiment of the "pucker" limitation in the spring (10). The spring (10) may include cutouts (310) positioned about the "U" shaped ends (26) and (28). These cut-outs (310) permit bending upward of bale portion (320) which will limit the "pucker" of portion (315) of the "U" to control the deflection of the spring as explained above.

As seen in FIG. 20, the pucker limitation by bale (320) operating on the "U" portion (315) controls the "U" section cross-section deflection or bending of the strip to control the deflection of the spring during the second mode of deformation.

One skilled in the art will readily see varying uses for the present invention. One use of the present invention is that of a hose clamp, like that disclosed in applicant's U.S. Pat. No. 4,843,686, entitled "Serpentine Strip Spring Hose Clamp", the specification of which is further incorporated by reference.

While the above summarizes the present invention, it will become apparent to those skilled i the art that modifications, variations, and alterations may be made without deviating from the scope and fair meaning of the subjoined claims.

What is claimed is:

1. A spring comprising:
   a substantially flat, elongated, strip of material having a thickness with a sufficiently large modulus of elasticity or stiffness including a resilient serpentine biasing portion integrally formed in said elongated strip, said resilient serpentine biasing portion comprised of a plurality of interconnected unitary U-shaped members having a pair of legs connected by a curved web, each alternating U-shaped member being inverted with respect to its adjacent U-shaped members, an elongated slot formed between the legs of each U-shaped member, said elongated slot extending from a lateral edge of the strip past the longitudinal axis of the strip, said resilient serpentine biasing portion enabling axial deflection along the elongated axis of said spring, said resilient serpentine biasing portion U-shaped members having an overall rectangular cross-section with a substantially constant thickness resiliently deflecting in a first direction along said elongated axis in response to a force applied on said strip and resiliently deflecting in a second direction along said thickness of said cross-section in response to continued force applied on said strip and one or more discontinuities in said resilient serpentine biasing portion for controlling said resilient deflection in said second direction, said discontinuities formed by at least one indentation along said thickness positioned substantially on at least one web portion, said strip returns to its original nondeflected position upon removal of said force.

2. The spring according to claim 1 wherein said second direction deflection is altered by means that alter the deflection characteristics governed by the thickness of said elements.

3. The spring according to claim 1 wherein means to limit the extension of said spring are combined with said spring.

4. The spring according to claim 1 further comprising means for limiting deflection across the thickness of the resilient serpentine biasing portion, said limiting means coupled with said resilient serpentine biasing portion.

5. The spring according to claim 4 wherein said limiting means is integrally formed with said resilient serpentine biasing portion.

6. The spring as defined in claim 1 including means for operatively supporting said spring so as to apply a compressive force thereto.

7. A spring comprising:
   an elongated, substantially flat, metallic strip having a thickness and end portion members on the axial ends of said strip, and
   a resilient serpentine biasing portion integrally formed in said strip between said end portion members, said resilient serpentine biasing portion comprised of a plurality of interconnected unitary U-shaped members having a pair of legs connected by a curved web, each alternating U-shaped member being inverted with respect to its adjacent U-shaped members, an elongated slot formed between the legs of each U-shaped member, said elongated slot extending from a lateral edge of the strip past the longitudinal axis of the strip and said resilient serpentine biasing portion continuous with said elongated strip for providing axial deflection along the longitudinal axis of said strip, said resilient serpentine biasing portion U-shaped members each having an overall rectangular cross-section with a substantially constant thickness, said resilient serpentine biasing portion resiliently deflecting in a first direction along an elongated axis in response to a force applied on said strip and resiliently deflecting in a second direction along said thickness of said cross-section in response to continued force applied on said strip and one or more discontinuities on said resilient serpentine biasing portion of said strip for controlling said resilient deflection in said second direction, said discontinuities formed by at least one indentation along said thickness positioned substantially on at least one web portion, said strip returns to its original nondeflected position upon removal of said force.

8. The spring according to claim 7 wherein said deflection is also derived from flexure of the narrow or thickness direction of said resilient serpentine biasing portion and said thickness dimension being less than ⅓ the dimension in the broad direction.

9. The spring according to claim 7 wherein said resilient serpentine biasing portion extends from one of said end members to the other of said end members.

10. The spring according to claim 7 wherein said resilient serpentine biasing portion extends partially between said end members.

11. The spring according to claim 7 wherein said resilient serpentine biasing portion being a serpentine configuration integrally formed in said broad direction of said elongated strip.

12. The spring according to claim 7 wherein flexure across the narrow direction is altered by forming of portions of the resilient serpentine biasing portion to a non-planar shape.

13. The spring according to claim 7 wherein said elongated, flat, metal strip being formed from a metallic sheet material.

14. A spring comprising:
   a resilient elongated substantially flat serpentine configuration metallic strip having end members integrally formed in said serpentine strip for enabling securement of said spring, said serpentine strip between said end members comprised of a plurality of interconnected unitary U-shaped members having a pair of legs connected by a curved web, each alternating U-shaped member being inverted with respect to its adjacent U-shaped members, an elongated slot formed between the legs of each U-shaped member, said elongated slot extending from a lateral edge of the serpentine strip past the longitudinal axis of the serpentine strip and continuous with said serpentine strip for providing said serpentine strip with resilient spring characteristics, said serpentine strip U-shaped member having an overall rectangular cross-section with a substantially constant thickness, said serpentine strip resiliently deflecting in a first direction along a longitudinal axis in response to a force applied on said serpentine strip and resiliently deflecting in a second direction along said thickness of said cross-section in response to continued force applied on said serpentine strip and one or more discontinuities on said serpentine strip for controlling said resilient deflection in said second direction, said discontinuities formed by at least one enclosed aperture along said thickness positioned in at least one web portion, said serpentine strip returns to its original nondeflected position upon removal of said force.

15. Method of manufacturing a spring comprising:
providing an elongated, flat planar metallic material sheet with a substantially constant thickness,
forming an elongated strip with an integral resilient biasing portion including a plurality of interconnected unitary U-shaped members having a pair of legs connected by a curved web, each alternating U-shaped member being inverted with respect to its adjacent U-shaped members, an elongated slot formed between the legs of each U-shaped member, said elongated slot extending from a lateral edge of the strip past the longitudinal axis of the strip, said strip having an overall rectangular cross-section with a substantially constant thickness, and having one or more discontinuities in the U-shaped members, said discontinuities formed by at least one indentation along said thickness positioned substantially on at least one web portion, said biasing portion enabling longitudinal axial deflection and deflection along the thickness of the cross-section of said spring.

16. The method according to claim 15 further comprising forming end members on said elongated strip.

17. The method according to claim 15 wherein material is removed to form said biasing portion and said one or more discontinuities further includes stamping as a method for forming one or more discontinuities.

18. The method according to claim 17 wherein said stamping also provides shapes across the broad dimension and thickness dimension of the strip for purpose of a non-linear spring constant.

* * * * *

UNITED STATES PATENT AND TRADEMARK OFFICE
CERTIFICATE OF CORRECTION

PATENT NO. : 4,919,403

DATED : April 24, 1990

INVENTOR(S) : Donald D. Bartholomew

It is certified that error appears in the above-identified patent and that said Letters Patent is hereby corrected as shown below:

Col. 1, Line 6, "field" should be --filed--;

Col. 1, Line 51, "i" should be --in--;

Col. 3, Line 62, "do" should be --due--;

Col. 5, Line 29, "16)" should be --(16)--;

Col. 5, Line 31, "portion (16)" should be --portion (18)--;

Col. 8, Line 20, "114)" should be --(114)--;

Col. 9, Line 10, "i" should be --in--.

Signed and Sealed this

Fourth Day of February, 1992

Attest:

HARRY F. MANBECK, JR.

Attesting Officer      Commissioner of Patents and Trademarks